United States Patent
Lu et al.

(10) Patent No.: US 7,139,024 B2
(45) Date of Patent: Nov. 21, 2006

(54) LARGE-AREA IMAGER WITH DIRECT DIGITAL PIXEL OUTPUT

(75) Inventors: Jeng Ping Lu, San Jose, CA (US); Koenraad F. Van Schuylenbergh, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 616 days.

(21) Appl. No.: 10/206,743

(22) Filed: Jul. 26, 2002

(65) Prior Publication Data

US 2004/0017494 A1   Jan. 29, 2004

(51) Int. Cl.
    *H04N 3/14*  (2006.01)
(52) U.S. Cl. .................................. 348/303; 348/308
(58) Field of Classification Search ................ 348/302
    See application file for complete search history.

(56) References Cited

U.S. PATENT DOCUMENTS

| 5,371,351 | A * | 12/1994 | Van Berkel | 250/208.1 |
| 5,650,643 | A * | 7/1997 | Konuma | 257/225 |
| 5,801,657 | A * | 9/1998 | Fowler et al. | 341/155 |
| 6,271,785 | B1 * | 8/2001 | Martin et al. | 341/169 |
| 6,377,303 | B1 * | 4/2002 | O'Connor | 348/308 |
| 6,498,576 | B1 * | 12/2002 | Tian et al. | 341/155 |
| 6,518,909 | B1 * | 2/2003 | Yang et al. | 341/155 |
| 6,867,804 | B1 * | 3/2005 | Kim et al. | 348/294 |
| 6,873,364 | B1 * | 3/2005 | Krymski | 348/308 |

OTHER PUBLICATIONS

Yang et al.; "A Nyquist-Rate Pixel-Level ADC for CMOS Image Sensors"; IEEE Journal of Solid-State Circuits, vol. 34, No. 3, Mar. 1999; pp. 348-356.

* cited by examiner

*Primary Examiner*—Ngoc-Yen Vu
*Assistant Examiner*—Dillon Durnford-Geszvain
(74) *Attorney, Agent, or Firm*—Bever, Hoffman & Harms, LLP; Patrick T. Bever

(57) ABSTRACT

An imager circuit includes an array of pixels, each pixel including a sensor (photodiode) connected to an input terminal of a comparator. The comparators of each pixel row have output terminals connected to a latch. A counter generates a sequence of digital values that are transmitted to a digital-to-analog converter (DAC) and to the latch of each row. The DAC generates a ramp voltage that is transmitted to a second input terminal of each pixel's comparator. The comparators of a selected pixel column are enabled to generate output signals when the ramp voltage equals each pixel's voltage, causing the associated latches to capture the current digital values. The comparators are formed such that each pixel row shares a cascode mirror circuit that detects differential currents in data line pairs connected to each pixel in that row.

13 Claims, 8 Drawing Sheets

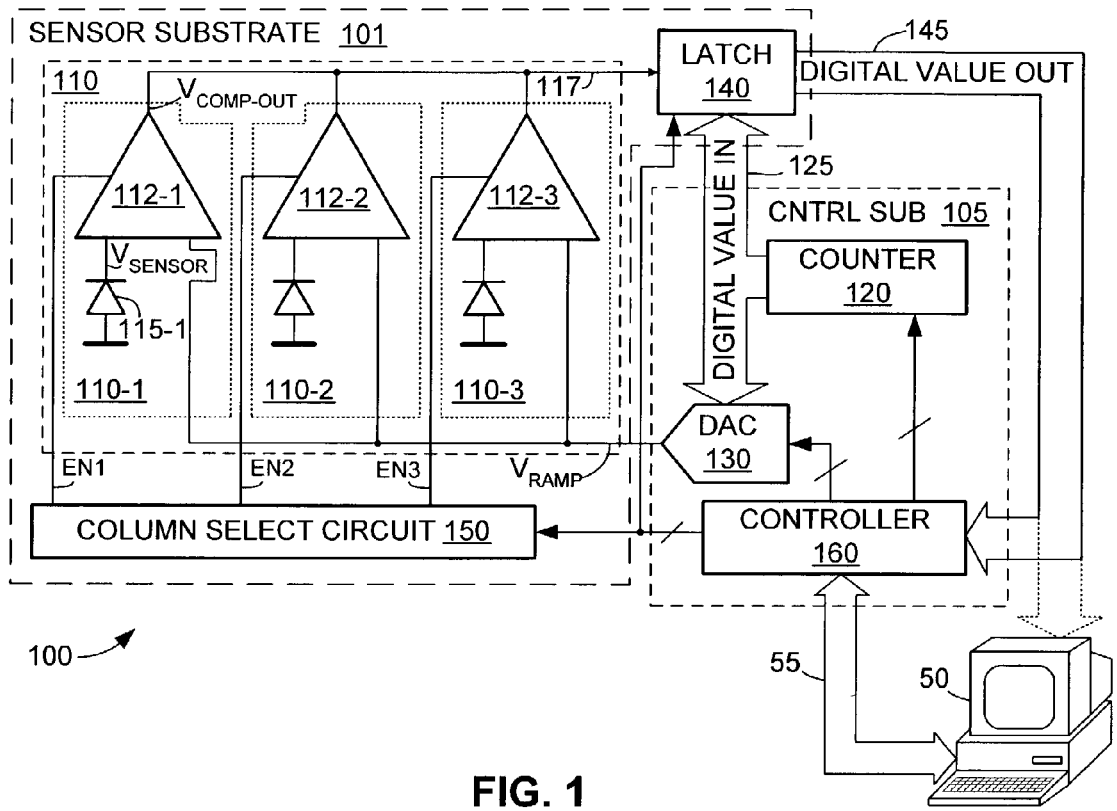
FIG. 1
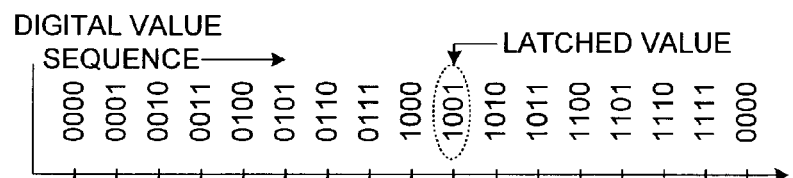
FIG. 2(A)
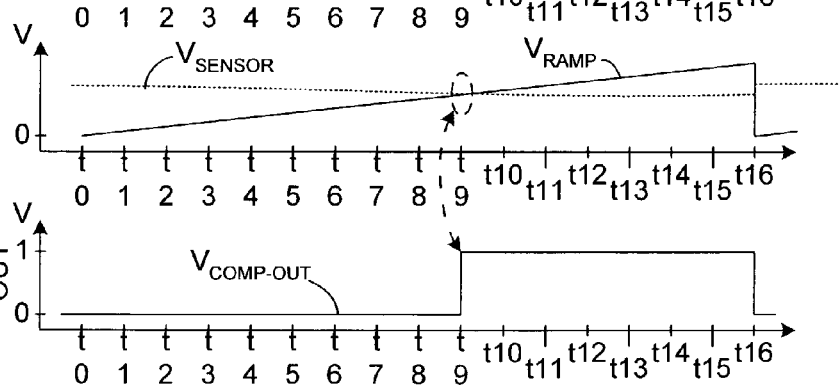
FIG. 2(B)
FIG. 2(C)

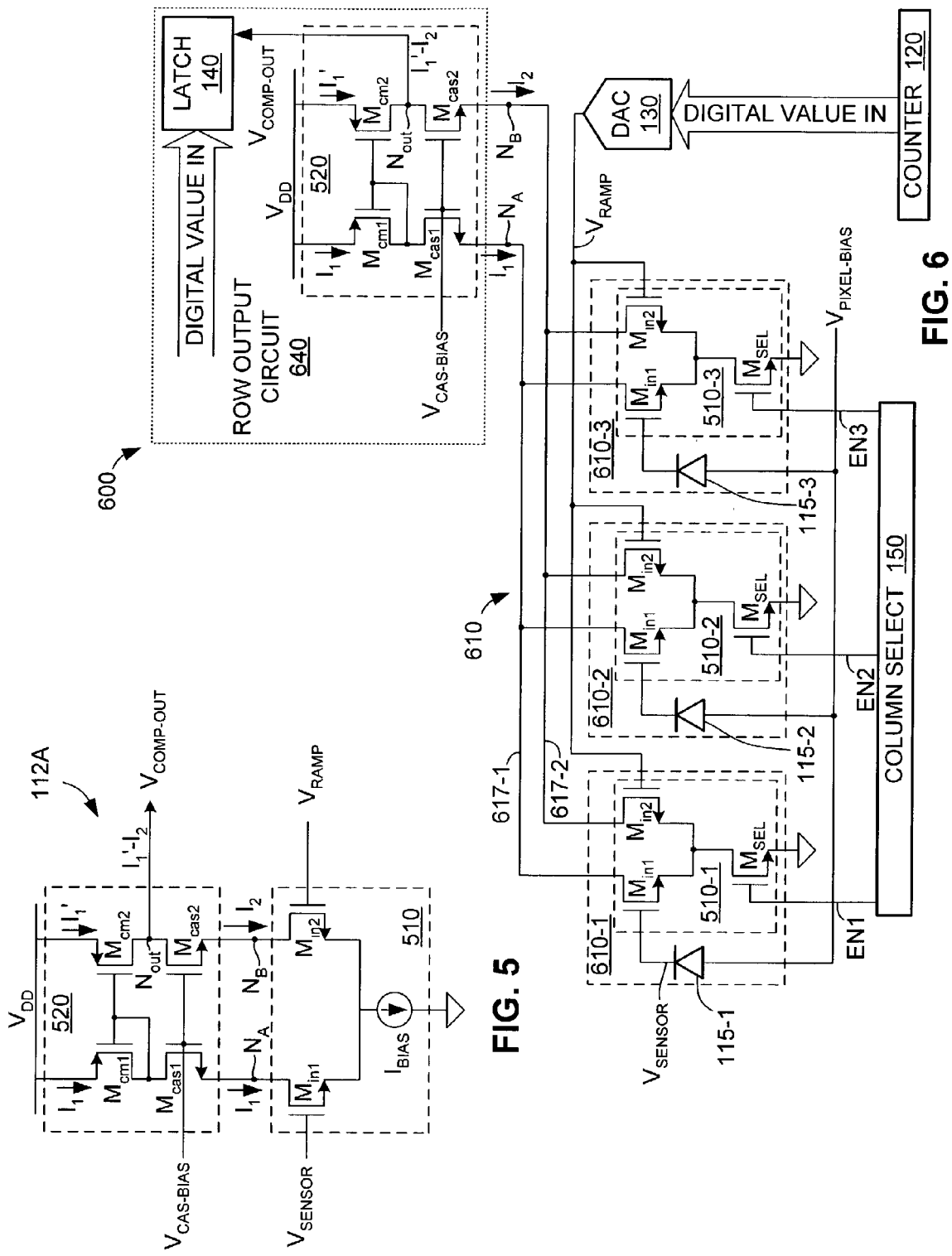

US 7,139,024 B2

LARGE-AREA IMAGER WITH DIRECT DIGITAL PIXEL OUTPUT

FIELD OF THE INVENTION

This invention relates to imaging devices, and in particular to imaging systems that utilize large-area sensor arrays.

BACKGROUND OF THE INVENTION

FIG. 11 is a circuit diagram showing a simplified conventional large-area imaging system ("imager") 50, which is a well-known device that utilizes a large-area sensor array and associated electronics to capture radiation images (e.g., visible light images, or high-energy X-ray images). Conventional large imaging system 50 includes a large-area sensor substrate 60 (e.g., glass or quartz) having formed thereon pixels 61 that are arranged in rows and columns, and a separate control/readout circuit 70 that is used to drive and read image data from sensor substrate 60 during imager operation. Each pixel 61 typically includes a sensor (radiation detection element) 62 and an access transistor 63, which is typically a thin film transistor (TFT) formed on substrate 60. Each sensor typically includes a photosensitive region (e.g., a p-i-n photodiode formed using amorphous silicon (a-Si)) that is formed over access transistors 62, and is connected to a bias voltage $V_{bias}$. As indicated in FIG. 11, the access transistors in each column of pixels are accessed by an associated word line 64, and data read from the sensors in each row of pixels is passed to an associated data line 65 during readout operations. When exposed to a radiation pattern (e.g., an x-ray image), each sensor 62 generates a sensor charge that is representative of the quantity of ionizing radiation incident on that sensor. When accessed during a sensor readout operation, the sensor signal is transmitted on an associated data line 64 to control/readout circuit 70, which amplifies and/or converts the sensor signal to form digital image data. This digital image data is then stored with image data read from all pixels of the array, and can be used to produce an image representing the original radiation image.

Several problems are associated with conventional large-area imaging systems.

First, conventional large-area imaging systems typically require that sensor substrate 60 and control/readout substrate 70 be fabricated separately, and connected by a large number of connections. The large-area process used to manufacture sensor substrate 60 cannot produce the conventional integrated circuitry associated with control/readout circuit 70, thereby requiring separate sensor substrate 60 and control/readout circuit 70 to be formed on separate substrates using different fabrication techniques. After being produced by separate fabrication techniques, sensor substrate 60 and control/readout circuit 70 are then combined during production using wires or other connectors 75. The large number of required connectors 75 gives rise to increased production costs and other associated problems, such as limited image quality due to data-line noise pickup and/or kTC noise, electromechanical reliability, and production yield. Further, the number of required connections 75 is associated with the size of the sensor array (i.e., one connection per word line, one connection per data line, plus additional connections for bias voltage $V_{bias}$, etc.). Therefore, increasing the number of pixel rows and/or columns to increase the imager size or resolution involves increasing the number of connections, which in turn increases production costs and the other associated problems mentioned above.

Another problem associated with conventional large-area imaging systems is that data line capacitance and switching noise, which increase with the pixel array size, are the dominant noise sources in the imager system. Conventional imagers drain sensor charges onto associated data lines during readout. The longer data lines associated with large-area sensor arrays represent a greater data-line capacitance, which in turn requires larger access transistors to facilitate readout of the data in a timely manner. The large access-transistor gates cause a high gate-line feed-through charge and associated noise. The larger data-line capacitance increases the associated kTC noise. Both noise sources greatly reduce the accuracy of the read out data and dominate the overall imager system performance. Reducing the size of the access transistors may reduce this noise term, but also decreases readout speed.

Accordingly, what is needed is a large-area imaging system in which the number of connections between a sensor substrate and control substrate is minimized, and in which the dominant noise effects and the readout speed are independent of the array size.

SUMMARY OF THE INVENTION

The present invention is directed to imaging systems that generate an analog ramp voltage based on a digital value sequence, compare the ramp voltage with the sensor voltage generated in each pixel, and capture the digital value at the time the ramp voltage equals the sensor voltage, thereby directly converting the sensor voltage to a digital pixel output. Such imaging systems utilize column control and output multiplexing formed directly on the sensor substrate to fix the connections between the sensor substrate and an external controller, when used, regardless of the sensor array size.

In accordance with an embodiment of the present invention, a large-area imaging system includes a sensor substrate including a pixel array having pixels arranged in rows and columns, and a latch circuit connected to each row of pixels, the large-area image system also including a separate control/readout substrate including a digital counter for generating a sequence of digital values, and a digital-to-analog converter (DAC) for generating a ramp voltage in response to the sequence of digital values. Each pixel of the pixel array includes a sensor (e.g., a photodiode) for generating a sensor voltage in response to an applied radiation amount, and a comparator for comparing the sensor voltage with the ramp voltage. One column of pixels is enabled (selected) at a time during readout using a column select circuit (e.g., a shift register). The comparator of each enabled pixel transmits a high output signal to an associated latch circuit when the ramp voltage exceeds that pixel's sensor voltage (all other pixels coupled to the associated latch are disabled). Each latch circuit is triggered by the high output signal from an enabled pixel comparator to capture the digital value generated by the counter at the time the ramp voltage first exceeds the pixel's sensor voltage, thereby directly converting the analog sensor voltage to a digital value. In one embodiment, the digital values captured for each row are shifted into a second latch, and then serially transmitted via a multiplexer to the peripheral control circuitry, thereby facilitating readout (sampling) of another column during the data transfer process. Accordingly, a relatively small number of connections are required between the sensor substrate and the peripheral control/readout substrate (i.e., a few clock and control signals for controlling the column select circuit, two digital value busses for transmitting the digital value sequence and captured digital values, one connection for the ramp voltage, and a few additional control signals). Note that because DACs are relatively inexpensive and because the ramp voltage requires only one connection, the DAC is preferably formed on the control/readout substrate with the peripheral control/readout circuitry (i.e., not on the sensor substrate).

In accordance with another embodiment of the present invention, the comparators utilized to compare the sensor voltage with the global ramp voltage are cascode-based. The comparison circuit provided in each pixel includes a pair of source-coupled input transistors respectively connected to the globally distributed ramp voltage and the sensor voltage generated by the sensor of that pixel. The cascode circuit includes a current mirror connected to a pair of cascode transistors, which in turn are controlled by a differential current generated by the input transistors in response to the sensor voltage and global ramp voltage, respectively. When the global ramp voltage exceeds the sensor voltage, a comparator output signal generated by the cascode mirror circuit shifts from a first value (e.g., low voltage) to a second value (e.g., a high voltage). This comparator output signal is utilized to trigger a latch, which in turn captures a digital value generated by a counter that is related to the global ramp voltage in the manner described above.

In accordance with yet another embodiment, a cascode-based comparator structure is incorporated into the sensor array of an imaging system such that each pixel in a row of pixels includes only a comparison circuit (portion) that is connected to a shared cascode mirror circuit (portion) by a pair of differential current data lines. The pixels are enabled column by column, so only one pixel in each row is enabled at a given time. The comparison circuit of the enabled pixel generates differential currents in the shared differential current data lines. Each shared cascode mirror circuit operates as described above to control a latch when the global ramp voltage exceeds the sensor voltage of an enabled pixel connected to that cascode mirror circuit by the differential current data lines.

In accordance with yet another embodiment, each comparison circuit includes a biasing circuit that is connected to the source-coupled input transistors and facilitates enabling a selected column of pixels. This biasing circuit includes a select transistor, a global current source, and a current mirror formed by a first bias transistor connected between the current source and ground, and a second bias transistor in each pixel that is connected between the select transistor and ground. Gate terminals of the first and second bias transistors are connected to the current source. When the biasing circuit is enabled (i.e., a column enable signal is asserted that is applied to the gate terminal of the select transistor), the select transistor is turned on to couple the bias source to the source-coupled input transistors, thereby enabling the generation of differential currents in the data lines. When the biasing circuit is subsequently disabled, the select transistor is turned off, and the source-coupled input transistors stop carrying current and thus do not influence the differential current on the shared data lines.

In accordance with yet another embodiment, the biasing circuit of each comparison circuit includes a reset transistor that is connected between the gate terminals of the source-coupled input transistors and controlled by the same column enable signal used to control the select transistor. In this embodiment, when a pixel is enabled, the column enable signal is raised to a first (intermediate) voltage such that the select transistor is turned on but the reset transistor remains turned off. At the end of the sample cycle (i.e., when the digital counter value reaches a maximum value), the column enable signal is raised to a second (high) value, which turns on the reset transistor to transfer the high ramp voltage to the pixel, thereby resetting the sensor voltage. When the pixel is subsequently disabled, the column enable signal is de-asserted (low), thereby turning off both the select and reset transistors.

Based on the aspects and features mentioned above and described herein, the present invention provides an imaging system that scales well with the size of the sensor array. First, the sensor substrate pin (connector) count is independent of the imager size due to the column select circuitry and digital multiplexer that are formed on the sensor substrate. Second, differential current data line signals facilitate recording sensor information for an entire row of pixels without changing the data line voltage. Pixel information is thus transferred over the data lines without needing to charge or discharge the data line capacitance, thereby enabling fast response that is independent of the imager size. Third, also due to the differential current data line signals, the noise performance is independent of the imager size. And fourth, for a constant pixel readout rate (in pixels/second), the power consumption is only linearly proportional to the imager height (i.e., number of pixel rows) and independent of pixel width (i.e., number of pixel columns).

BRIEF DESCRIPTION OF THE DRAWINGS

These and other features, aspects and advantages of the present invention will become better understood with regard to the following description, appended claims, and accompanying drawings, where:

FIG. 1 is a block diagram showing an imaging system according to a simplified embodiment of the present invention;

FIGS. 2(A), 2(B), and 2(C) are timing diagrams showing signals generated during the operation of the imaging system shown in FIG. 1;

FIG. 5 is a schematic diagram showing a comparator circuit utilized in pixels of an imaging system in accordance with a specific embodiment of the present invention;

FIG. 6 is a schematic diagram showing an imaging system according to another specific embodiment of the present invention;

DETAILED DESCRIPTION OF THE DRAWINGS

Figure 3:
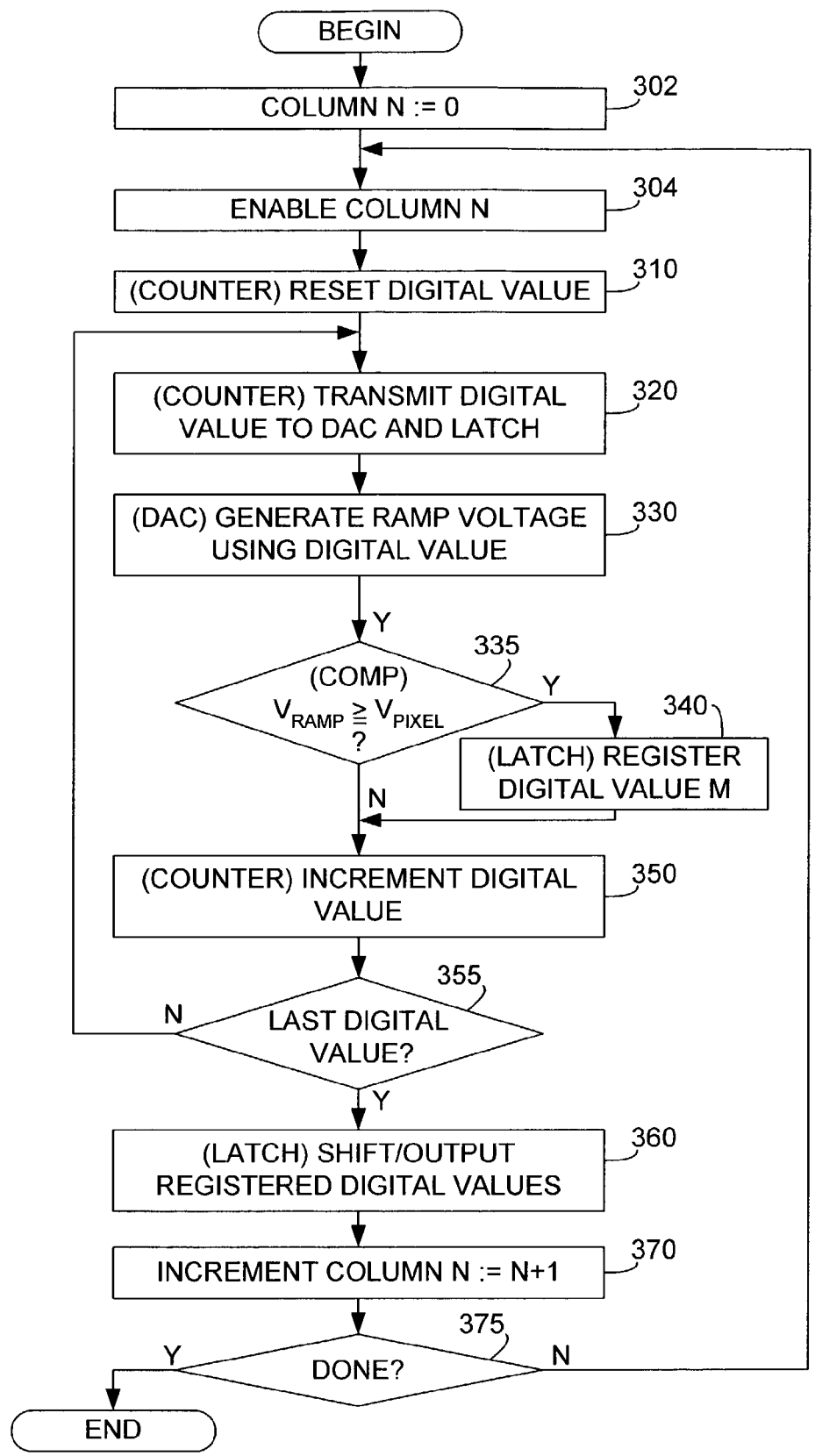
FIG. 3 is a flow diagram showing the operation of an imaging system according to an embodiment of the present invention.

FIG. 1 is a block diagram showing an imaging system 100 according to a simplified embodiment of the present invention. Imaging system 100 includes an array of pixels 110 arranged in rows and columns (one row including pixels 110-1 through 110-3 is shown), a digital counter 120, a digital-to-analog converter (DAC) 130, at least one edge-triggered latch 140, and a column select circuit 150. In accordance with an aspect of the present invention, pixel array 110, latch 140, and column select circuit 150 are fabricated on a sensor (first) substrate 101, and counter 120 and DAC 130 are separately fabricated on a control/readout substrate (CNTRL SUB) 105, which also includes an optional system control circuit 160. Optional system control circuit 160 generates control signals that are transmitted to the various circuits of imaging system 100, and also coordinates communication between imaging system 100 and an external computer 50 via an external bus 55. Communication between the various circuits of imaging system 100 is performed using several connections linking sensor substrate 101 and control/readout substrate 105, which are discussed below.

Referring to the left side of FIG. 1, each pixel (e.g., pixel 110-1) of pixel array 110 includes a comparator (e.g., comparator 112-1) and a sensor (e.g., sensor 115-1). The sensor of each pixel includes a radiation detection element (e.g., an a-Si photodiode or other sensor) that operates according to known methods such that, during exposure, each sensor generates a charge corresponding to an amount of incident radiation, and this charge is stored on the sensor capacitance to provide a corresponding sensor voltage $V_{SENSOR}$. Sensor array 110 can be either a full fill-factor array or an isolated sensor array. The sensor voltage $V_{SENSOR}$ generated by the sensor of each pixel is applied to a first input terminal of that pixel's comparator (e.g., photodiode 115-1 of pixel 110-1 is connected to the left side input terminal of comparator 112-1). The second (i.e., right side) input terminal of each comparator is connected to receive a ramp voltage $V_{RAMP}$, which is generated by DAC 130, as described below. The output terminal of each comparator in each row of pixels (e.g., comparators 112-1 through 112-3 of pixels 110-1 through 110-3) is connected to a corresponding data line 117, which is turn is connected to the trigger (enable) terminal of an associated latch 140 (i.e., each row of pixels is connected to a corresponding latch 140). Digital values that are captured by latch 140 according to the operation described below are transmitted on a digital value output (DIGITAL VALUE OUT) bus 145 to optional controller 160, or directly to external computer 55 (as indicated in dashed lines).

According to an aspect of the present invention, the ramp voltage $V_{RAMP}$ transmitted to each comparator of pixel array 110 is generated by DAC 130 in response to a sequence of digital values generated by counter 120, and the sequence of digital values is also transmitted to the latch (e.g., latch 140) located at the end of each row of pixels. Counter 120 generates the sequence of digital values in response to a clock signal generated according to known techniques. The sequence of digital numbers generated by counter 120 are transmitted on a digital value input (DIGITAL VALUE IN) bus 125 to DAC 130, and also to each latch 140. DAC 130 operates according to known techniques such that analog ramp voltage $V_{RAMP}$ is proportional to the digital value generated by counter 120.

A simplified description of the operation of imaging system 100 will now be described with reference to FIGS. 1 and 2(A) through 2(C), and 3. FIG. 2(A) is a timing diagram showing the generation of digital values according to the present example. FIG. 2(B) is a timing diagram showing ramp voltage $V_{RAMP}$ (which is actually incrementally increased at each time t0 through t15) and a sensor voltage $V_{SENSOR}$ generated by sensor 110-1 during the same time period as that shown in FIG. 2(A). FIG. 2(C) is a timing diagram showing a comparator output voltage $V_{COMP-OUT}$ generated by a comparator in accordance with the ramp voltage $V_{RAMP}$ and the sensor voltage $V_{SENSOR}$ shown in FIG. 2(B). Finally, FIG. 3 is a flow diagram showing the operation of imaging system 100 according to an embodiment of the present invention.

Referring to the top of FIG. 1 and FIG. 3, operation begins by selecting an initial column of pixels in pixel array 110 (block 302), and then enabling the comparators of that column by asserting the associated enable signal. Referring to FIG. 1, pixel array 110 is controlled by column select circuit 150 to enable one column of pixels at a time. In this example, column select circuit asserts enable signal EN1, thereby enabling comparator 112-1 of pixel 110-1 (enable signals EN2 and EN3 remain de-asserted, and comparators 112-2 and 112-3 of pixels 110-2 and 110-3 remain disabled while pixel 110-1 is enabled). As indicated in FIG. 2(B) at this time, pixel 110-1 is exposed to a desired image, and sensor 115-1 generates sensor voltage $V_{SENSOR}$ that is proportional to an amount of light received at pixel 110-1 in a manner similar to that used in conventional imagers. However, instead of passing sensor voltage $V_{SENSOR}$ to a data line and draining its charge into an external charge-sensitive amplifier, as in conventional imagers, sensor voltage $V_{SENSOR}$ is applied to the first terminal comparator 112-1, which compares sensor voltage $V_{SENSOR}$ with ramp voltage $V_{RAMP}$, as discussed below.

Next, the digital value sequence is reset or otherwise initialized at binary 0000 by counter 120 (FIG. 3, block 310). As shown in FIG. 2(A), counter 120 generates a sequence of digital values (e.g., binary 0000 through 1111 in the present example) during time period t0 through t15, and repeats the sequence starting at time t16. At time t0, the initial count value (i.e., binary 0000) is transmitted on bus 125 to DAC 130 and latch 140 (FIG. 3, block 320). As indicated in FIG. 2(B), in response to the initial count value, DAC 130 generates a relatively low analog ramp voltage $V_{RAMP}$ (see also FIG. 3, block 330), which is applied to the second input terminals of all comparators in array 110, including comparator 112-1. Next, comparator 112-1 compares the sensor voltage $V_{SENSOR}$ generated by sensor 115-1 with the initial ramp voltage $V_{RAMP}$ (FIG. 3, block 335). Note that, as shown in FIG. 2(B), sensor voltage $V_{SENSOR}$ is greater than the initial ramp voltage $V_{RAMP}$. Therefore, the initial result from the comparison operation is "NO", so control passes to block 350 (FIG. 3), where the digital value is incremented (i.e., increased to binary 0001) and, because this next digital value is not the last value (i.e., "NO" in block 355), control passes again to block 320.

The process shown in blocks 320 through 355 is repeated (i.e., with a "NO" result in block 335) until ramp voltage $V_{RAMP}$ exceeds sensor voltage $V_{SENSOR}$. Referring to FIGS. 2(A) and 2(B), as the digital values increase, the magnitude of analog ramp voltage $V_{RAMP}$ also increases until, at time t9, ramp voltage $V_{RAMP}$ exceeds sensor voltage $V_{SENSOR}$ for the first time. As indicated in FIG. 2(C), while ramp voltage $V_{RAMP}$ is less than sensor voltage $V_{SENSOR}$, a comparator output signal $V_{COMP-OUT}$ generated by comparator 112-1 remains low (e.g., 0 volts), thereby preventing latch 140 from capturing a digital value transmitted on bus 125. That is, the compare operation performed in block 335 (FIG. 3) continues to generate a "NO" result, thereby passing control to block 350. However, when ramp voltage $V_{RAMP}$ is equal to (i.e., becomes greater than) sensor voltage $V_{SENSOR}$ (e.g., at time t9), comparator output signal $V_{COMP-OUT}$ switches high, thereby causing latch 140 to capture (latch) the "current" digital value (i.e., binary 1001) that is present on bus 125 at that time. Finally, when the digital value sequence reaches its maximum value (i.e., at time t15), the latched data for pixel 110-1 is passed via digital value output bus 145 to control circuit 160 or external computer 50 (block 360). Because the pixels of pixel array 110 are enabled column by column, enable signal EN1 is then disabled and enable signal EN2 is enabled (block 370), and the above operation is repeated for pixel 110-2, and then for pixel 110-3 (i.e., for each column of pixel array 110) until all pixels of pixel array 110 have been read (i.e., "YES" in block 375).

The process indicated by the flow diagram of FIG. 3 is intended to illustrate the operation of imaging system 100 according to one possible method, and is not intended to be limiting. Those of ordinary skill in the art will recognize that the individual processes performed at each block shown in FIG. 3 may be re-arranged or replaced with comparable processes.

Imaging system 100 provides several benefits over conventional imaging systems.

First, the present invention facilitates the production of imagers having dramatically reduced pin counts, as compared to conventional imaging systems. As discussed above, conventional large-area 2D imagers have a large number of connections to their peripheral electronics (i.e., one column-select line (or "gate line") per pixel column, and one data line per pixel row). In contrast, because column selection is performed using a column select circuit 150 (such as a shift register), which is formed directly on imager substrate 101 using the same TFT process used to form pixel array 110, imaging system 100 eliminates the need for a separate column pin for each column of pixels. That is, because the pixel columns are selected one after the other, they can be driven from a shift register that requires only a few timing signals (typically two supply lines, a data input line, clock1 and clock1-bar lines, and sometimes clock2 and clock2-bar lines, where "-bar" is utilized herein to signify an inverted signal). In addition to these column select circuit control signals, imager substrate 101 requires pins for digital value input bus 125 and digital value output bus 145, whose lengths are determined by the desired amplitude resolution, a pin for the ramp voltage $V_{RAMP}$ generated by DAC 130, a few pins to support power supply lines, and a few pins to support timing signals used to control the column select circuit and an output multiplexer (discussed below). Therefore, as compared to conventional imaging systems, imaging system 100 provides dramatically reduced pin counts that are independent of the imager size.

A second benefit of imaging system 100 is that, because each pixel utilizes a comparator to determine the sensor voltage $V_{SENSOR}$, reading out a pixel of imaging system 100 does not drain the photo charge collected on the sensor capacitor, as in conventional imagers, thereby allowing the performance of correlated double sampling at each pixel.

Assuming identical input transistors, the noise performance of comparator 112 is comparable to (actually, $\sqrt{2}$ times) the noise performance an integrated pixel charge amplifier. The equivalent charge noise of image system 100 is independent of the data line capacitance or resistance, which is similar to imager systems with pixel-level amplifiers.

Another benefit of imaging system 100 is that each pixel generates a direct digital output, as opposed to the analog sensor output generated by conventional imagers that must then be converted on the readout substrate to a digital value. The analog data format is more prone to distortion and noise pick up than the digital format disclosed herein, especially when running over longer interconnects.

As mentioned above, pixel array 110, latches 140, and column select circuit 150 are formed on imager substrate 101 to minimize the connector count, and counter 120 and DAC 130 are formed on control/readout substrate 105. Note that little benefit is gained by integrating DAC 130 onto imager substrate 101—only one DAC is needed, and integration would save only one connection. DACS are also commercially available for a low price. Therefore, DAC 130, along with counter 120, are preferably fabricated on control/readout substrate 105 along with control circuit 160, which can be implemented using a programmable logic device, or a micro-controller that communicates with the host computer 50 via bus 55.

In accordance with the embodiments described herein, counter 120 is operated such that the digital value sequence increases linearly from a relatively low value (e.g., binary 0000) to a relatively high value (e.g., binary 1111), such that the ramp voltage $V_{RAMP}$ increases from a relatively low voltage (e.g., 0 volts) to a relatively high voltage (e.g., $V_{DD}$). However, in other embodiments, a non-linear or declining ramp voltage $V_{RAMP}$ can be generated either by generating a non-linear or declining digital value sequence, or by utilizing a non-linear or declining DAC. For example, a non-linear digital value sequence (e.g., 0000, 00010, 0100, 1000) can be applied to a linear DAC to produce a non-linear ramp voltage. Alternatively, a non-linear DAC can be operated using a linear digital value sequence to produce a non-linear ramp voltage. Further, controller 160 can control counter 120 to adjust the digital value sequence in response to the detected image during operation, thereby facilitating enhanced amplitude resolution. For example, a digital value sequence generated by counter 120 may be adjusted to include only relatively high digital values when the controller determines the incident image is relatively bright, or adjusted to include only relatively low digital values when the controller determines the incident image is relatively dark. Both DAC circuits and digital counters suitable for performing the functions described herein are well known, and are therefore not discussed in detail herein.

Several additional features and benefits associated with the present invention are described with reference to the specific examples provided below.

Figure 4:
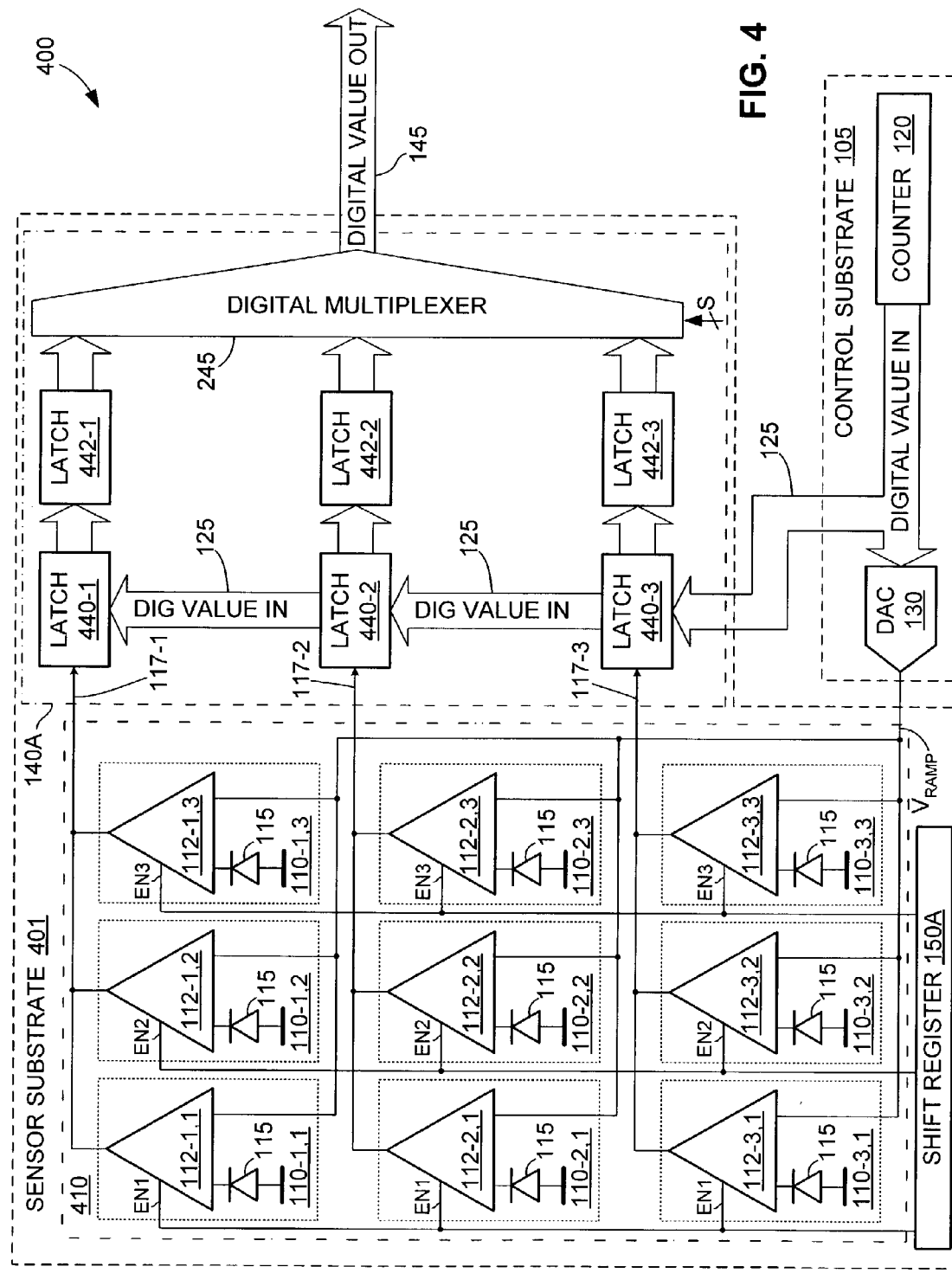
FIG. 4 is a block diagram showing an imaging system according to another embodiment of the present invention.

FIG. 4 is a block diagram showing an imaging system 400 according to another simplified embodiment of the present invention. Similar to imaging system 100, imaging system 400 includes a pixel array 410, a shift register (column select circuit) 150A, and a pipelined data latching circuit 140A, all of which are formed on a sensor substrate 401. Also shown in FIG. 4 are counter 120 and DAC 130, which are formed on control/readout substrate 105 and operate as described above. Additional structures of imaging system 400 are omitted for brevity.

Referring to the left side of FIG. 4, pixel array 410 includes pixels 110-1,1 through 110-3,3, each including a sensor 115 and an associated comparator. The comparators of each row of pixels are connected to an associated data line. In particular, a first row of pixels 110-1,1 through 110-1,3 includes comparators 112-1,1 through 112-1,3 having output terminals connected to a first data line 117-1, a second row of pixels 110-2,1 through 110-2,3 includes comparators 112-2,1 through 112-2,3 having output terminals connected to a second data line 117-2, and a third row of pixels 110-3,1 through 110-3,3 includes comparators 112-3,1 through 112-3,3 having output terminals connected to a third data line 117-3. The comparators of each column of pixels are controlled by an associated enable signal. In particular, a first column of pixels 110-1,1 through 110-3,1 includes comparators 112-1,1 through 112-3,1 that are controlled by enable signal EN1, a second column of pixels 110-1,2 through 110-3,2 includes comparators 112-1,2 through 112-3,2 that are controlled by enable signal EN2, and a third column of pixels 110-1,3 through 110-3,3 includes comparators 112-1,3 through 112-3,3 that are controlled by enable signal EN3.

Pipelined latch circuit 140A facilitates readout of the captured digital data values while a next image is being sampled. Pipelined latch circuit 140A includes a first set of latches 440-1 through 440-3 connected to each row of pixels (i.e., connected to each data line 117-1 through 117-3), a second set of latches 442-1 through 442-3 for storing digital values shifted from the first set of latches, and a digital multiplexer 445. That is, after a first set of digital data values are read out (i.e., at the end of the digital value sequence generated by counter 120), the captured data values from each row are transferred from the first set of latches (i.e., latches 440-1 through 440-3) to the second set of latches (latches 442-1 through 442-3), from which the digital values are serially read out using digital multiplexer 445 while a next set of digital values are being captured by the first set of latches according to the process described above. Accordingly, this pipelined output structure facilitates speeding up the sampling process by reading out "old" image data from the second set of latches while "new" image data is being captured by the first set of latches.

FIG. 5 is a schematic diagram showing a comparator circuit 112A that can be utilized in pixels of the imager circuits introduced above in accordance with a specific embodiment of the present invention. Comparator circuit 112A is based on the conventional cascode comparator, and is divided into a comparison portion 510 and a cascode mirror portion 520 for purposes that will become clear below. Comparison portion 510 includes a pair of source-coupled thin-film transistors (TFTS) $M_{in1}$ and $M_{in2}$ that are biased by a current source $I_{bias}$. TFT $M_{in1}$ is connected between a first node $N_A$ and bias source $I_{bias}$, and is controlled by a sensor voltage $V_{SENSOR}$, which is generated in the pixel in which comparator 112A is located. TFT $M_{in2}$ is connected between a second node $N_B$ and current source $I_{bias}$, and is controlled by global ramp voltage $V_{RAMP}$. Cascode mirror portion 520 includes a current mirror formed by TFTs $M_{cm1}$ and $M_{cm2}$, and a cascode transistor pair including TFTs $M_{cas1}$ and $M_{cas2}$. Current mirror TFT $M_{cm1}$ has a drain (first terminal) connected to a system voltage supply $V_{DD}$, and a source (second terminal) and gate connected to a drain (first terminal) of cascode TFT $M_{cas1}$. Current mirror TFT $M_{cm2}$ has a drain (first terminal) connected to a system voltage supply $V_{DD}$, a source (second terminal) connected to a drain (first terminal) of cascode TFT $M_{cas2}$, and a gate connected to the drain of cascode TFT $M_{cas1}$. Cascode TFTs $M_{cas1}$ and $M_{cas2}$ are controlled by a global cascode bias voltage $V_{CAS-BIAS}$.

During operation, a differential input voltage (i.e., a difference between sensor voltage $V_{SENSOR}$ and ramp voltage $V_{RAMP}$) causes an unbalance in the branch currents $I_1$, and $I_2$, which flow through node $N_A$ and TFT $M_{in1}$, and node $N_B$ and TFT $M_{in2}$, respectively. The current mirror (i.e., TFTs $M_{cm1}$ and $M_{cm2}$) mirrors current $I_1$, which also passes through TFT $M_{cm1}$, to produce mirror current $I_1'$ passing through TFT $M_{cm2}$. The difference $I^{1'}-I_2$ flows into the output node $N_{out}$, where it produces an output voltage $V_{COMP-OUT}$ that is equal to $(I_1'-I_2) \cdot Z_{out}$ (where $Z_{out}$ is the impedance of output node $N_{out}$) Turning on and off bias source $I_{bias}$ enables and disabled comparison circuit 510, thereby enabling and disabling comparator circuit 112A. The switching of bias source $I_{bias}$ is described in additional detail below. It is noted that, although comparator circuit 112A is described herein as being formed using NMOS input TFTS, a comparable function can be produced using PMOS-input comparators.

Although one comparator circuit 112A can be utilized in each pixel of an imaging system (i.e., in place of comparator 112 in imaging system 100; see FIG. 1), this arrangement may require an unnecessarily large amount of substrate area. Referring again to FIG. 5, note that the cascode TFTs $M_{cas1}$ and $M_{cas2}$ do not influence differential currents $I_1$ and $I_2$, but keep the voltages at nodes $N_A$ and $N_B$ constant. Further, when bias source $I_{bias}$ is turned off, nodes $N_A$ and $N_B$ of a disabled comparison circuit 510 are in a high impedance state. Therefore, the present inventors have recognized that it is possible to separate comparator 112A into two parts (namely, comparison portion 510 and cascode mirror portion 520), and to form a pixel array in which each pixel includes only comparison portion 510, and each row of pixels "shares" a single cascode mirror portion 520. This shared-cascode comparator arrangement is described in additional detail in the specific embodiments discussed below.

FIG. 6 is a schematic diagram showing a portion of an imaging system 600 according to another embodiment of the present invention. Imaging system 600 includes a pixel array 610 including a row of pixels 610-1 through 610-3, a pair of differential data lines 617-1 and 617-2 connected to each pixel 610-1 through 610-3, and a row output circuit 640 connected to differential data lines 617-1 and 617-2. Also shown in FIG. 6 are a column select circuit (e.g., a shift register) 150 for selectively asserting enable signals EN1 through EN3, a counter 120 and a DAC 130, which operate as described above. Additional structures of imaging system 600 are omitted for brevity.

In accordance with another aspect of the present invention, each pixel 610-1 through 610-3 includes a comparison circuit similar to comparison circuit 510 (discussed above with reference to FIG. 5) and shares a single cascode mirror portion 520 (also discussed above with reference to FIG. 5), which is incorporated into row output circuit 640 and connected to each pixel 610-1 through 610-3 via data lines 617-1 and 617-2, which carry the branch currents $I_1$ and $I_2$. In particular, pixels 610-1 through 610-3 include associated sensors 115-1 through 115-3 and comparison circuits 510-2 through 510-3, respectively. Note that each comparison circuit 510-1 through 510-3 includes source-coupled TFTs $M_{in1}$ and $M_{in2}$, as described above with reference to FIG. 5, and also includes a select TFT $M_{SEL}$, which is controlled by an associated enable signal EN1 through EN3 generated by column select circuit 150. Note that, when asserted, enable signals EN1 through EN3 are maintained at voltages suitable for causing TFTs $M_{SEL}$ to operate in saturation mode, thereby providing a current source for pixels 610-1 through 610-3. The upper (first) terminals of source-coupled TFTs $M_{in1}$ and $M_{in2}$ of each comparison circuit 510-1 through 510-3 are connected to differential data lines 617-1 and 617-2, which in turn are connected to data nodes $N_A$ and $N_B$ located at the lower end of cascode mirror portion 520. Cascode mirror portion 520 includes current mirror TFTs $M_{cm1}$ and $M_{cm2}$, and cascode TFTs $M_{cas1}$ and $M_{cas2}$, as described above with reference to FIG. 5. Comparator output voltage $V_{COMP-OUT}$ is generated at output node $N_{out}$, and controls a pixel row latch 140, which is also incorporated into row output circuit 640, in the manner similar to that described above.

During operation, only one comparison circuit 510-1 through 510-3 (i.e., only one column of pixels) is enabled at a give time by asserting only one of enable signals EN1 through EN3. When enabled, comparison circuit 510-1 generates branch currents $I_1$ and $I_2$ on data lines 617-1 and 617-2 according to a difference between ramp voltage $V_{RAMP}$ and the sensor voltage $V_{SENSOR}$ generated sensor 115-1. Note that comparison circuits 510-2 and 510-3 are disabled, and therefore do not influence the branch currents generated by comparison circuit 510-1. When the sensor voltage $V_{SENSOR}$ is greater than ramp voltage $V_{RAMP}$, the branch current $I_1$ is greater than the branch current $I_2$, which causes cascode mirror portion 520 to generate a high comparator output voltage $V_{COMP-OUT}$, thereby disabling latch 140. Subsequently, when the digital value increases such that ramp voltage $V_{RAMP}$ exceeds the sensor voltage $V_{SENSOR}$, the relationship between the branch currents $I_1$ and $I_2$ on data lines 617-1 and 617-2 reverses, which causes cascode mirror portion 520 to generate a low comparator output voltage $V_{COMP-OUT}$ thereby toggling latch 140 such that it captures the current digital value generated by counter 120. After the digital data count is completed, enable signal EN1 is de-asserted and latch 140 is read out to computer 50 and reset, and then enable signal EN2 is asserted. In this manner, the sensor information generated by each pixel in a row of pixels is read out using a single cascode mirror portion 520.

Because only the difference between branch currents $I_1$ and $I_2$ is used to represent the sensor information generated by each pixel 610-1 through 610-3, and not the individual values of branch currents $I_1$ and $I_2$, the shared-cascode comparator arrangement of imaging system 600 facilitates active suppression of common mode noise that is independent of imager size. Data line pairs 617-1 and 617-2 thus act as differential data lines. Moreover, the voltages on differential data lines 617-1 and 617-2 are kept constant by shared cascade mirror portion 520 regardless the data (branch) currents $I_1$ and $I_2$. Accordingly, the transient comparator response of imaging system 600 is not slowed down by the large data line capacitance, and is independent of the imager size. Accordingly, the data line signals differential current arrangement utilized by imaging system 600 allows a fast response that independent of imager size, and for a constant pixel readout rate (in pixels per second), the power consumption of imaging system 600 is only linearly proportional to imager size (i.e., number of rows).

Figure 7:
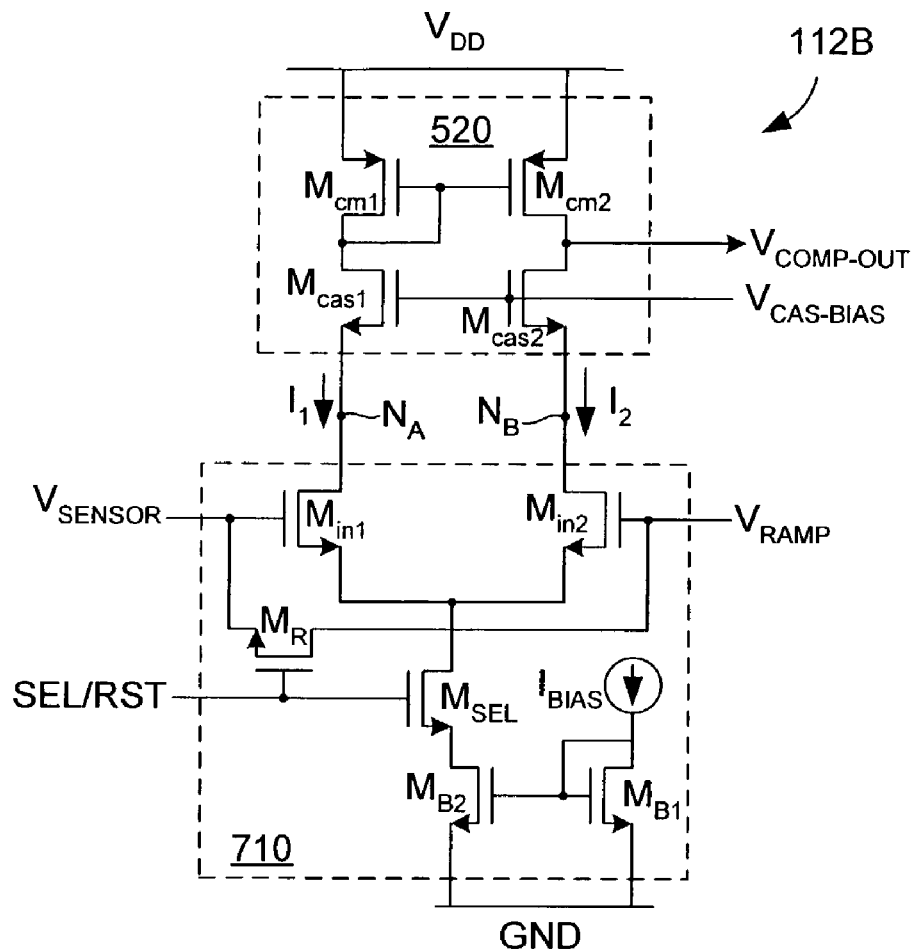
FIG. 7 is a schematic diagram showing a comparator circuit according to another specific embodiment of the present invention.

FIG. 7 is a schematic diagram showing a comparator circuit 112B according to another specific embodiment of the present invention that incorporates both bias switching and sensor-reset functions. Similar to comparator circuit 112A, comparator circuit 112B is based on a conventional cascade comparator, and is divided into a comparison portion 710 and cascode mirror portion 520 (which is essentially identical to that described above with reference to FIG. 5). Similar to comparison portion 510 (discussed above), comparison portion 710 includes source-coupled TFTs $M_{in1}$ and $M_{in2}$ that are respectively connected to nodes $N_A$ and $N_B$, and are respectively controlled by a sensor voltage $V_{SENSOR}$ and ramp voltage $V_{RAMP}$. The sources of TFTs $M_{in1}$ and $M_{in2}$ are connected to a select TFT $M_{SEL}$, similar to the structure described above with reference to FIG. 6. Comparison portion 710 also includes a reset TFT $M_R$, and a bias source $I_{bias}$ generated using a current mirror formed by a first (global) bias TFT $M_{B1}$ and a second bias TFT $M_{B2}$. Reset TFT $M_R$ is connected between sensor voltage $V_{SENSOR}$ and ramp voltage $V_{RAMP}$, and is controlled by a select/reset signal SEL/RST. First bias TFT $M_{B1}$ is connected between bias source $I_{bias}$ and ground, and second bias TFT $M_{B2}$ is connected between select TFT $M_{SEL}$ and ground.

Figure 8:
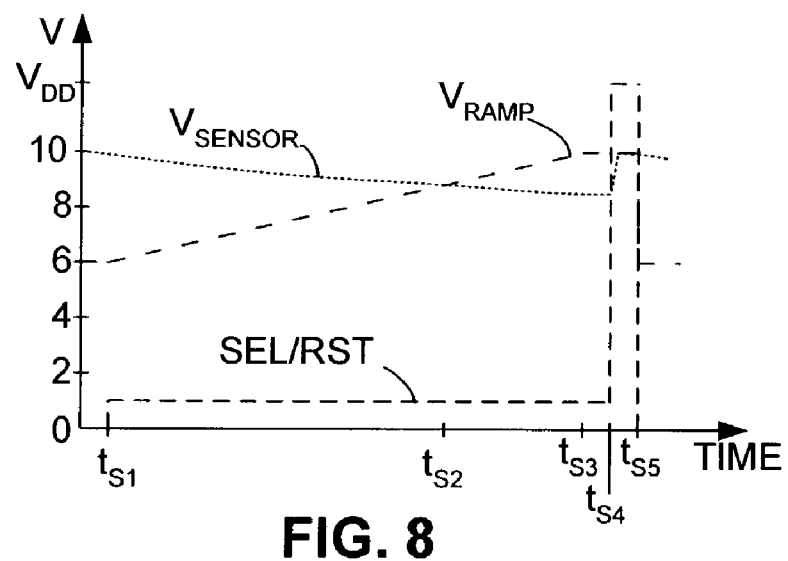
FIG. 8 is a timing diagram showing sensor, ramp, and select/reset signals generated in the comparator circuit of FIG. 7.

The operation of comparator circuit 112B is described with reference to FIG. 8, which is a timing diagram showing sensor voltage $V_{SENSOR}$, ramp voltage $V_{RAMP}$, and select reset signal SEL/RST. Selection and reset of a column of pixels is achieved by asserting select/reset signal SEL/RST to control select TFT $M_{SEL}$ and reset TFT $M_R$. In this embodiment, sensor voltage $V_{SENSOR}$ and ramp voltage $V_{RAMP}$ both operate well above the ground (e.g., between 6 and 10 Volts). At time $t_{S1}$ a pixel column is selected by raising select/reset signal SEL/RST two to three volts above ground to drive select TFT $M_{SEL}$ into saturation, thereby causing select TFT $M_{SEL}$ to act as a cascode transistor for second bias TFT $M_{B2}$. However, at this point, the gate voltage of reset TFT $M_R$ is still well below its source and drain voltages, which means that reset TFT $M_R$ remains turned off. With comparator circuit 112B thus enabled, ramp voltage $V_{RAMP}$ is increased until it exceeds sensor voltage $V_{SENSOR}$ (e.g., time $t_{S2}$), thereby causing the capture of the current digital value in the manner described above. In the example depicted in FIG. 8, ramp voltage $V_{RAMP}$ reaches its maximum value at time $t_{S3}$. Subsequently, at time $t_{S4}$, select/reset signal SEL/RST is driven up to $V_{DD}$ (e.g., 12 Volts), and then at $t_{S5}$, select/reset signal SEL/RST is pulled down to ground (0 Volts) and ramp voltage $V_{RAMP}$ is reset to its minimum value (e.g., 6 Volts). Between times $t_{S4}$ and $t_{S5}$ (i.e., while ramp voltage $V_{RAMP}$ is at its maximum value), the high voltage select/reset signal SEL/RST fully turns on reset TFT $M_R$, thereby resetting (i.e., pulling up) sensor voltage $V_{SENSOR}$ to the maximum ramp value (e.g., 10 Volts).

Similar to comparator circuit 112A (discussed above), it is possible to separate comparator 112B into multiple portions to form a pixel array in which each pixel includes only portions of the total comparator circuit 112B that cannot be shared with other pixels (i.e., with "shared" portions being utilized by more than one pixel of a pixel array). Examples of this arrangement are provided below.

Figure 9:
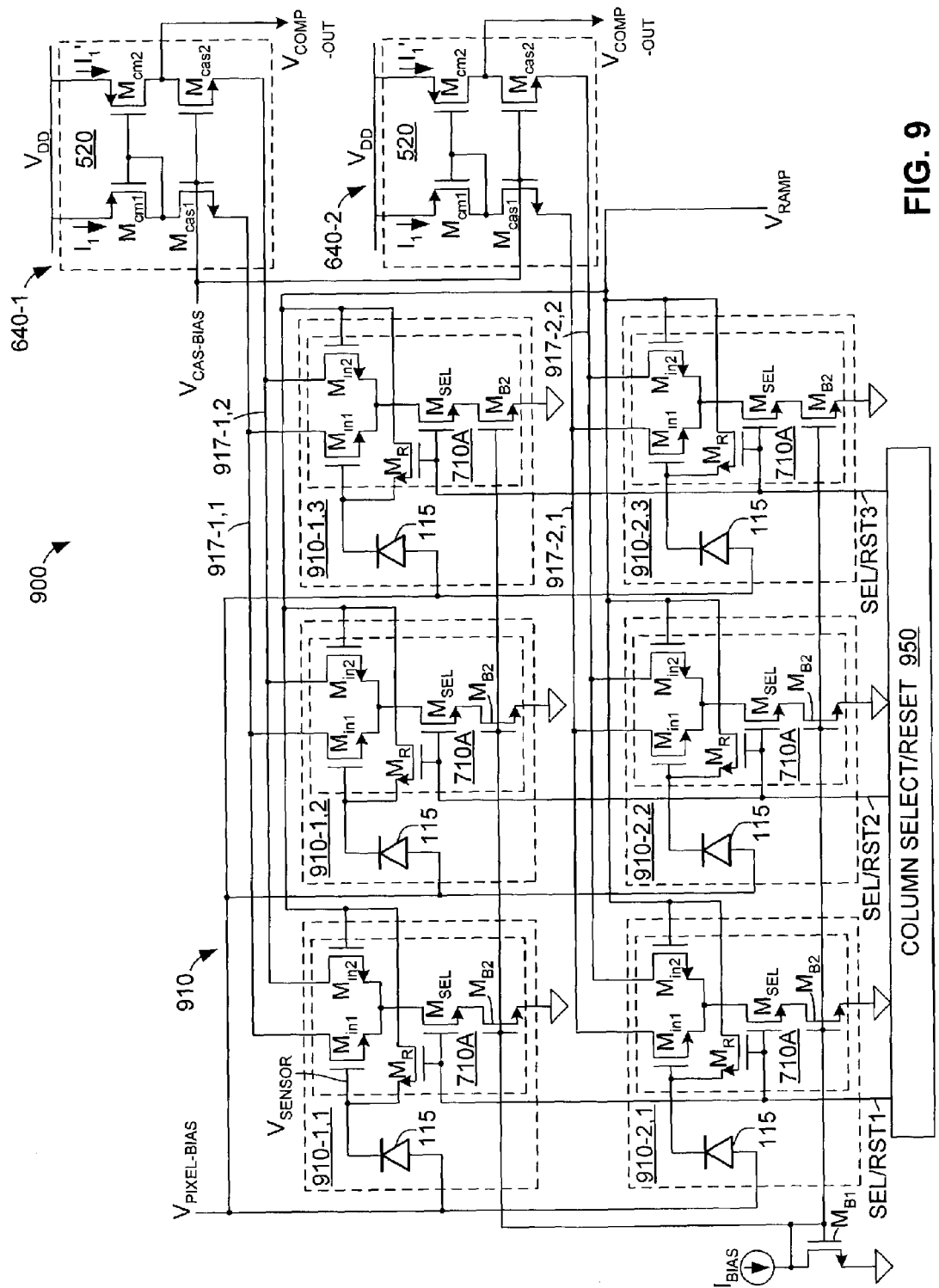
FIG. 9 is a schematic diagram showing an imaging system according to yet another specific embodiment of the present invention.

FIG. 9 is a schematic diagram showing two rows of an imaging system 900 according to another specific embodiment of the present invention. Imaging system 900 includes a pixel array 910 including a first row of pixels 910-1,1 through 910-1,3 and a second row of pixels 910-2,1 through 910-2,3. Similar to imaging system 600 (discussed above), pixels 910-1,1 through 910-1,3 of the first row are connected by a pair of differential data lines 917-1,1 and 917-1,2 to a row output circuit 640-1. Similarly, pixels 910-2,1 through 910-2,3 of the second row are connected by a pair of differential data lines 917-2,1 and 917-2,2 to a row output circuit 640-2. Each pixel includes a comparison portion 710A, which is similar to comparison portion 710 (discussed above), and each row output circuit 640-1 and 640-2 includes a cascode mirror portion 520 (also discussed above). A column select/reset circuit 950 is provided for selectively asserting select/reset signals SEL/RST1 through SEL/RST3, which are generated in the manner described above with reference to FIG. 8. Additional structures of imaging system 600 are omitted for brevity.

According to the present embodiment, comparison portions 710A of each pixel differ from comparison portions 710 in that bias source $I_{bias}$ and first (global) bias TFT $M_{B1}$ are shared by all pixels of pixel array 910. Accordingly, imaging system 900 takes advantage of shared circuit portions to minimize the size of each pixel, thereby facilitating the production of imaging systems having higher resolution while minimizing imager connections.

Note that imaging system 900 can be reset either in a column-by-column mode, or in a "flash" mode. The column by-column mode (described above), which is also sometimes called a fluoroscopy mode, produces equal exposure times for an imager that is continuously illuminated and read out. The "flash" or "X-ray" mode involves performing the reset operation once before a brief exposure to an image, and facilitates a somewhat faster readout of the resulting image (sensor) information by eliminating the reset operation after each column is read out.

Figure 10:
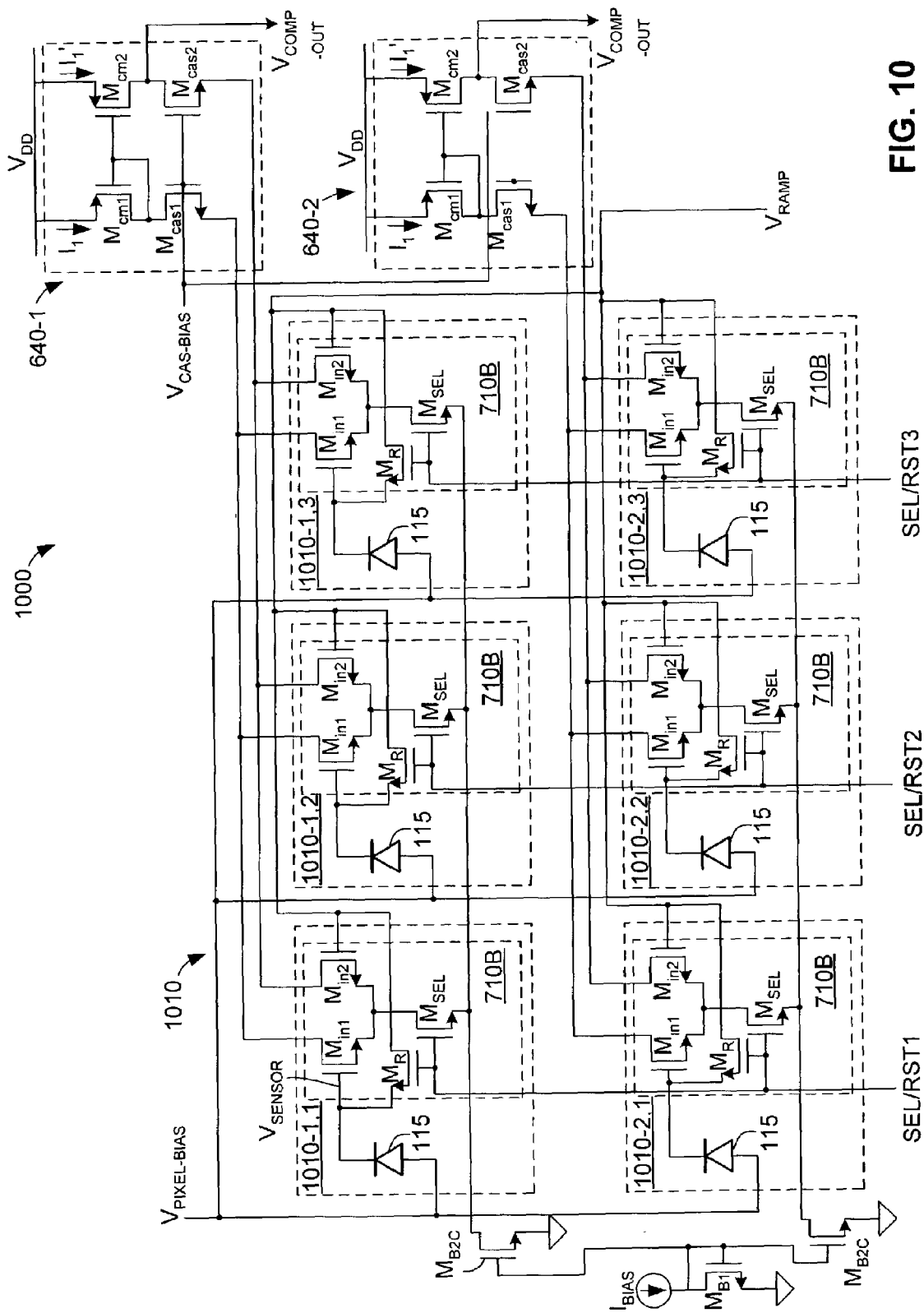
FIG. 10 is a schematic diagram showing an imaging system according to yet another specific embodiment of the present invention.
Figure 11:
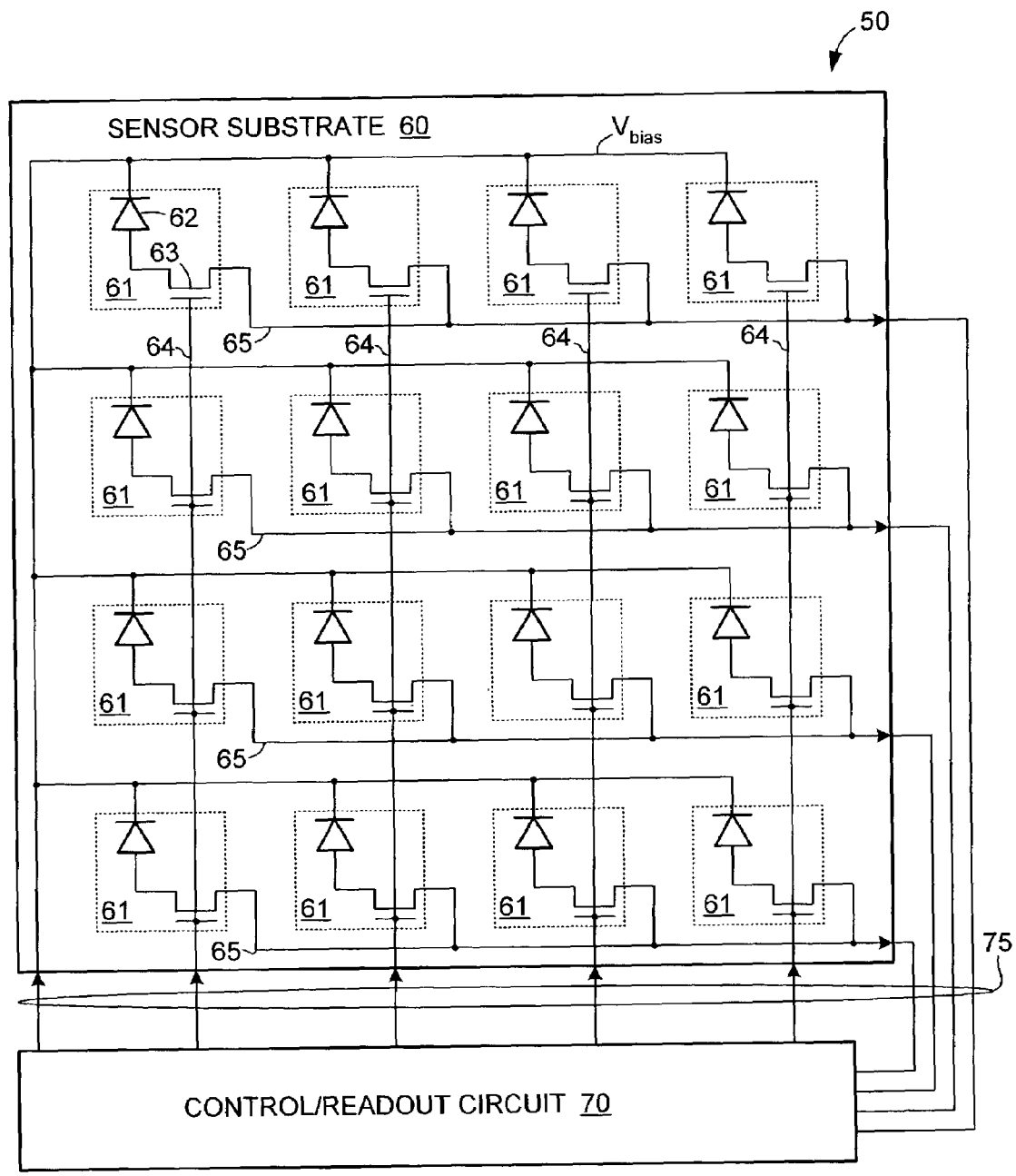
FIG. 11 is a circuit diagram showing a simplified conventional large-area imaging system.

Imaging system 900 can be further simplified by providing a single current source per row, instead of individual sources per pixel. FIG. 10 is a schematic diagram showing two rows of an imaging system 1000 according to another yet specific embodiment incorporating a single current source per row. Imaging system 1000 includes a pixel array 1010 including a first row of pixels 1010-1,1 through 1010-1,3 and a second row of pixels 1010-2,1 through 1010-2,3. Similar to imaging system 900 (discussed above), the first and second pixel rows are connected by pairs of differential data lines to row output circuits 640-1 and 640-2, respectively, which are described above. However, imaging system 1000 includes a bias TFT $M_{B2C}$ that is shared by each row of pixels, and each pixel includes a comparison portion 710B that differs from comparison portions 710A (see FIG. 9) in that second bias TFT $M_{B2}$ is omitted. Note that while this shared current source arrangement reduces the number of connections needed in array 1010, it may introduce some cross talk between pixels that share a current source. The operation of imaging system 1000 is otherwise similar to that of imaging system 900, described above.

Although the present invention has been described with respect to certain specific embodiments, it will be clear to those skilled in the art that the inventive features of the present invention are applicable to other embodiments as well, all of which are intended to fall within the scope of the present invention. For example, the direct digital readout arrangement or cascode-based comparator arrangement associated with the present invention are not limited to large-area imaging systems, but may be incorporated into smaller imagers in which both the sensor and control/readout circuitry are formed on a single substrate using, for example, CMOS fabrication techniques. Further, the functions associated with the control/readout circuitry (e.g., the digital counter value generated by counter 120) may be performed in software executed, for example, computer 50 (see FIG. 1), in which case computer 50 would be connected directly to sensor substrate 101 in a manner similar to that described herein.

The invention claimed is:

1. An imaging system comprising:
   first and second differential data lines;
   a plurality of pixels, each pixel including a sensor and a comparison circuit, the comparison circuit including a first input terminal connected to the sensor, a second input terminal connected to receive a global ramp voltage, and means for comparing a sensor voltage generated by the sensor with the global ramp voltage, for transmitting a first differential current onto the first and second differential data lines when the sensor voltage is less than the global ramp voltage, and for transmitting a second differential current onto the first and second differential data lines when the sensor voltage is greater than the global ramp voltage; and
   a comparator output circuit for generating a comparator output signal that has a first value when the first differential current is transmitted on the first and second differential data lines, and has a second value when the second differential current is transmitted on the first and second differential data lines,
   wherein the comparator output circuit includes means for keeping constant voltages on the first and second differential lines when currents on the first and second differential lines change from the first differential current to the second differential current.

2. The imaging system according to claim 1, further comprising:
   means for generating a sequence of digital values; and
   means for generating the global ramp voltage in response to the sequence of digital values.

3. The imaging according to claim 2, further comprising a latch circuit having a trigger terminal connected to receive the comparator output signal, and data input terminals connected to receive the sequence of digital values generated.

4. The imaging system according to claim 3,
   wherein the plurality of pixels, the comparator output circuit, and the latch circuit are formed on a first substrate, and
   wherein the digital value generating means and the ramp voltage generating means are formed on a second substrate that communicates with the first substrate through a plurality of connections.

5. The imaging system according to claim 1, where the comparator output circuit comprises a cascode mirror circuit.

6. An imaging system comprising:
   first and second differential data lines;
   a plurality of pixels, each pixel including a sensor and a comparison circuit for comparing a sensor voltage generated by the sensor with a global ramp voltage, for transmitting a first differential current onto the first and second differential data lines when the sensor voltage is less than the global ramp voltage, and for transmitting a second differential current onto the first and second differential data lines when the sensor voltage is greater than the global ramp voltage; and
   a cascode mirror circuit for generating a comparator output signal that has a first value when the first differential current is transmitted on the first and second differential data lines, and has a second value when the second differential current is transmitted on the first and second differential data lines,
   wherein comparison circuit of each pixel comprises:
   a first transistor having a first terminal connected to the first differential data line and a gate terminal connected to the sensor,
   a second transistor having a first terminal connected to the second differential data line and a gate terminal connected to receive the ramp voltage, and
   a bias circuit connected to second terminals of the first and second transistors.

7. The imaging system according to claim 6,
   wherein the bias circuit comprises a select transistor connected between the second terminals of the first and second transistors and a voltage source, and wherein the imaging system further comprises a column select circuit for controlling the select transistor.

8. The imaging system according to claim 6, wherein the bias circuit comprises:
a select transistor connected to the second terminals of the first and second transistors;
a current source;
a first bias transistor connected between the current source and a voltage source; and
a second bias transistor connected between the select transistor and the voltage source,
wherein the gate terminals of the first and second bias transistors are connected to the current source.

9. The imaging system according to claim 8, further comprising a reset transistor connected between gate terminals of the first and second transistors, wherein a gate terminal of the reset transistor is connected to a gate terminal of the select transistor.

10. The imaging system according to claim 9, wherein the imaging system further comprises means for controlling the select transistor and the reset transistor such that the select transistor is turned on and the reset transistor is turned off during a first time period, such that both the select transistor and the reset transistor are turned on during a second time period, and such that both the select transistor and the reset transistor are turned off during a third time period.

11. The imaging system according to claim 6, further comprising a current source and a first bias transistor connected between the current source and a voltage source, wherein the bias circuit of each pixel comprises a select transistor connected to the second terminals of the first and second transistors, and a second bias transistor connected between the select transistor and the voltage source,
wherein the gate terminals of the first bias transistor and the second bias transistors of each pixel are connected to the current source.

12. The imaging system according to claim 11, wherein the bias circuit of each pixel further comprises a reset transistor connected between gate terminals of the first and second transistors, wherein a gate terminal of the reset transistor is connected to a gate terminal of the select transistor.

13. The imaging system according to claim 12, wherein the imaging system further comprises means for controlling the select transistor and the reset transistor such that the select transistor is turned on and the reset transistor is turned off during a first time period, such that both the select transistor and the reset transistor are turned on during a second time period, and such that both the select transistor and the reset transistor are turned off during a third time period.

* * * * *